United States Patent
Russo

[11] 3,771,875
[45] Nov. 13, 1973

[54] INTERFEROMETER HAVING D.C. LEVEL COMPENSATION

[75] Inventor: John J. Russo, Norwalk, Conn.

[73] Assignee: The Perkin-Elmer Corporation, Norwalk, Conn.

[22] Filed: Nov. 15, 1971

[21] Appl. No.: 198,581

[52] U.S. Cl. .................................. 356/106, 356/113
[51] Int. Cl. ............................................. G01b 9/02
[58] Field of Search .............................. 356/106–113

[56] References Cited
UNITED STATES PATENTS
3,601,490   8/1971   Erickson .............................. 356/106

Primary Examiner—Ronald L. Wibert
Assistant Examiner—Conrad Clark
Attorney—Edward R. Hyde, Jr.

[57] ABSTRACT

An interferometer for precisely measuring the displacement of an object of the type including means: for reflecting from the object position a "measuring" beam of a first polarization condition, for combining therewith a "standard" beam of a second polarization condition, and for producing signals representative of interference produced between both beams, which signals vary according to the distance travelled by the measuring beam. The improvement involves causing the final signals developed to be free of any d.c. component, caused both (a) by background (unpolarized and/or depolarized) radiation, and (b) by the average (d.c.) level of the significant polarized radiation which generates the object distance a.c. signals. The specific embodiment provides three original object distance varying signals (A, B, C) with the second in phase opposition and the third in quadrature to the first. The algebraic difference (X) of the first two (A−B) and the difference (Y) of the third less the average of the first two ($C - A + B/2$) will both be free of any d.c. component caused by either background or average signal amplitude. These (X and Y) derived final a.c. signals provide precise actual measurement (interference "fringe" count) since they are exactly symmetrical to the zero level.

4 Claims, 12 Drawing Figures

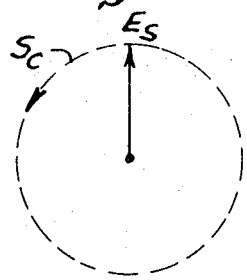
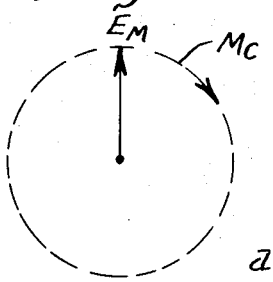
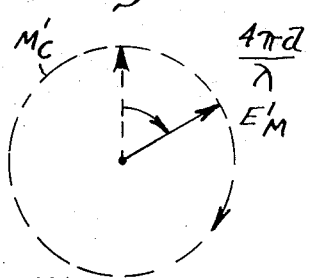
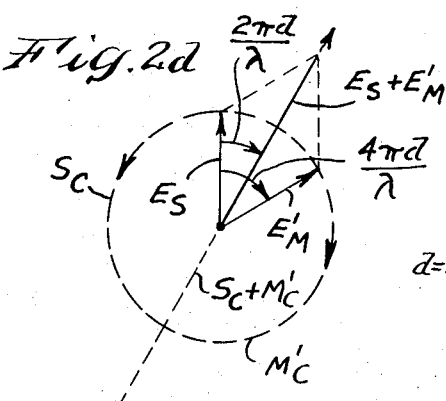
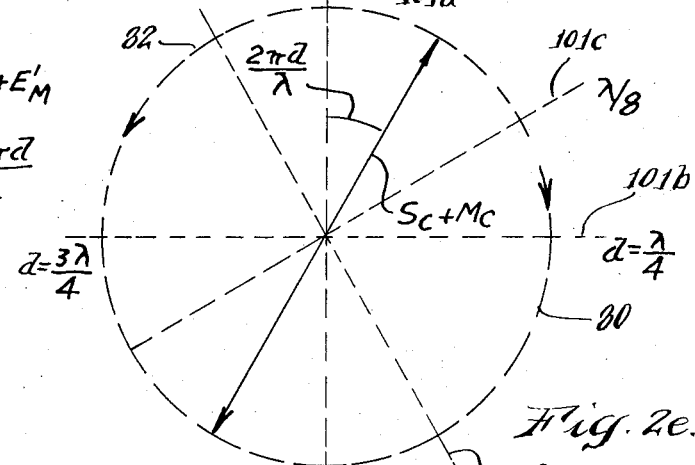
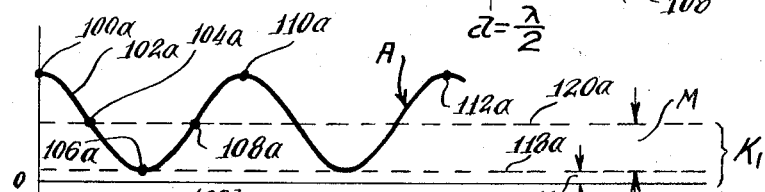
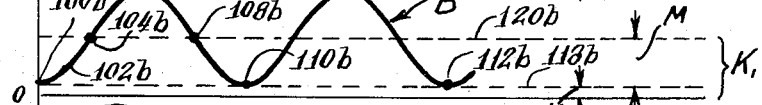
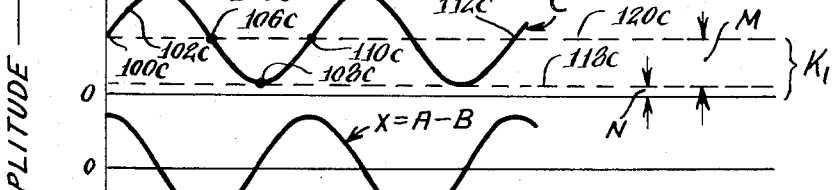
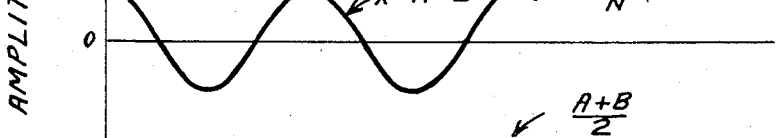
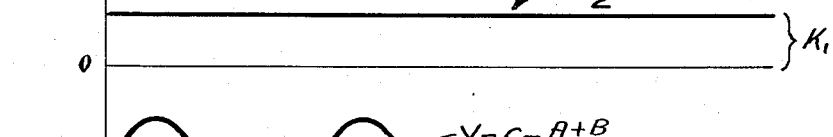
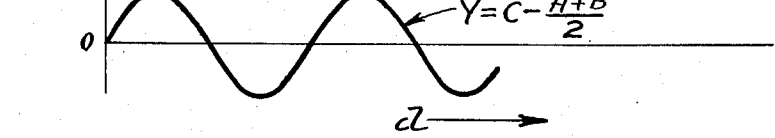

INTERFEROMETER HAVING D.C. LEVEL COMPENSATION

GENERAL DESCRIPTION

This invention relates to measuring devices of the optical interferometer type in which the distance to an object is measured by counting the number of interference fringes produced as the object moves through the distance to be measured.

Interferometers of this type generally comprise means for forming a radiation beam from a source, means for splitting this beam into the measuring beam and a standard or reference beam, reflective means at the object for reflecting back the measuring beam and means for recombining and causing interference between the return measuring beam and the standard beam. Typically, polarizing techniques are used to distinguish the measuring and standard beam. A change in the distance of the object carried reflector will produce a cyclical change in the intensity of the interference pattern which may be measured (hereinafter referred to as counting interference fringes) to determine the exact position of the object within a fraction of a wavelength of the radiation source. Typically automated distance measuring interferometers include two radiation detectors producing electrical signals in quadrature, the number of peaks (of either) of which are directly proportional to the change in the distance being measured, and the phase relationship between which yield the direction in which the object is moving (i.e., toward or away from the sensing portion of the device).

The present invention differs from prior automated measuring interferometer systems in that the final two electrical signals in quadrature that are utilized for determining the number and direction of "fringe movement" are made free of any D.C. signal component, so that these signals vary symmetrically about zero volts even when the radiation source (e.g., a laser) varies in power, other changes (e.g., dirt on the optics) would otherwise cause similar changes in the average D.C. level of the signals, or a steady background (D.C.) signal is present. Generally, this is accomplished by providing three separate detectors (rather than the typical two) which yield, respectively: A, a first signal of a particular electrical phase; B, a similar signal exactly 180° out of phase with the first; and, C, a third signal in quadrature with the first. Algebraic subtraction of the A. and B. signals will yield a different signal (hereinafter referred to as X) equal to twice the A.C. components of the two signals but free of the common D.C. level. One half of the algebraic sum of the A. and B. signals will yield their D.C. levels free of their A.C. components; and subtracting this average of A. and B. from the C. signal will yield a signal (hereinafter referred to as Y) which still is in quadrature with the X (or A) signal but it is also free of any D.C. component. Besides obtaining final signals (X and Y) which vary symmetrically about zero volts for all conditions of actual or effective radiant sourced power, these signals are also insensitive to external ("background") and internal (e.g., scattered) illumination, since each of the three detectors will receive an equal (or at least proportional) amount of such energy, which is also subtracted out in the final signals (X and Y) utilized.

An object of the invention is the provision of a distance measuring interferometer which is substantially insensitive to radiation energy changes caused by source energy fluctuations, return beam energy variation, and background radiation.

A related object of the invention is the provision of a distance measuring interferometer in which the interference fringe "counting" signals (X and Y) are symmetrical to zero volts, thereby being free of any D.C. level, so that the fringe counting may be accomplished at the zero crossing point rather than at some (variable) D.C. level.

Other objects, features and advantages of the invention will become obvious to one skilled in the art upon reading the following detailed description of a single exemplary embodiment of the invention, in conjunction with the accompanying drawings, in which:

FIG. 1 is a partially perspective schematic diagram of an entire exemplary and preferred embodiment of an interferometer according to the invention;

FIGS. 2a – 2e are diagrammatic representations in vector form of the optical properties of the standard and measuring beam components, both separately (FIGS. 2a – 2c) and after being combined (FIGS. 2d and 2e); and FIGS. 3a – 3f are graphical representations of both electrical signals obtained directly from the combined radiation signal of FIG. 2a by three different detectors (in FIGS. 3a – 3c), and electrical signals obtained from algebraic addition and subtraction of these detector signals (FIGS. 3d – 3f), the finally utilized signals being those shown in FIGS. 3d and 3f.

DETAILED DESCRIPTION OF EXEMPLARY EMBODIMENT

Figure 1:
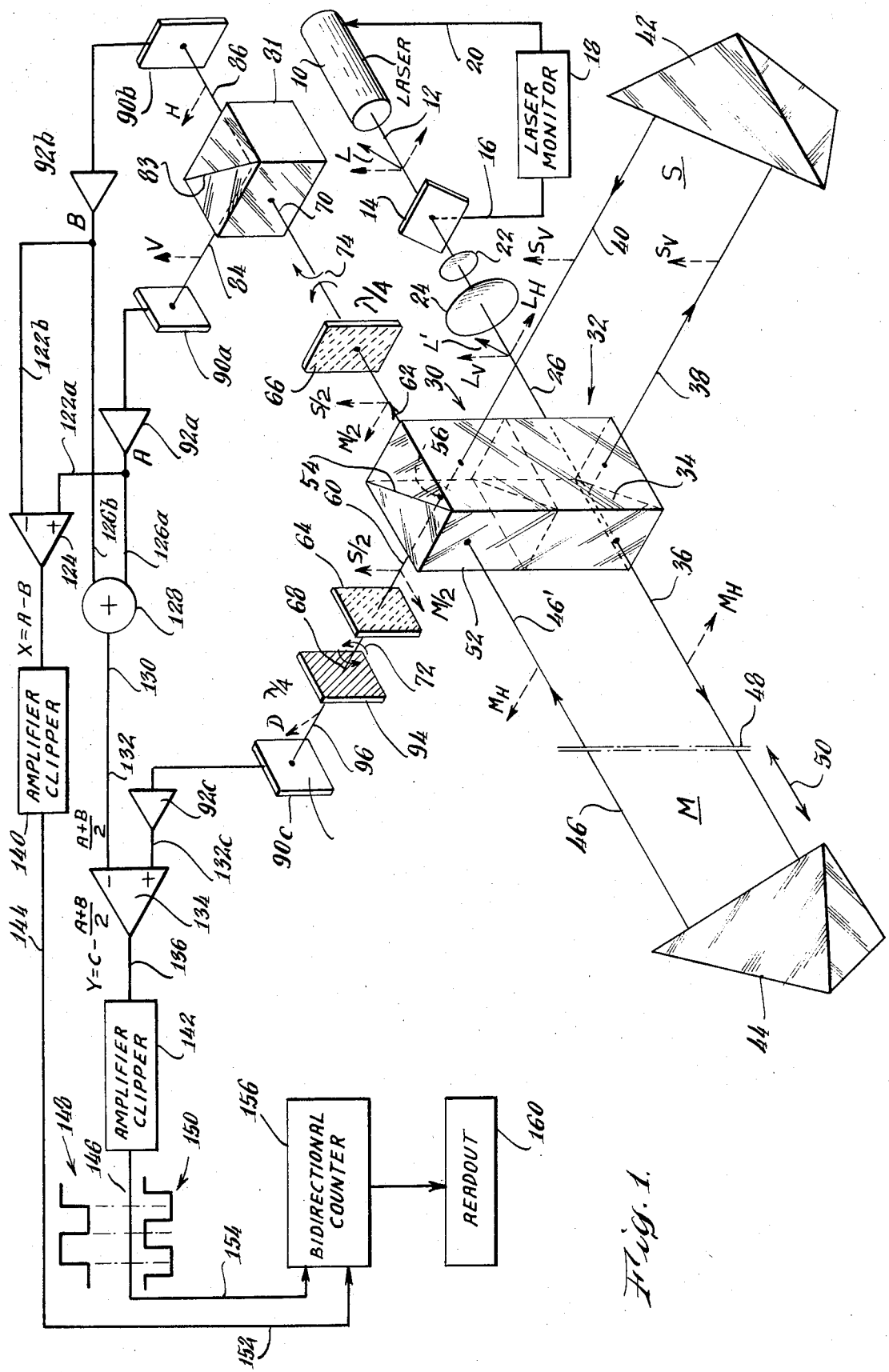

In FIG. 1a continuous (e.g., helium-neon gas) laser 10 provides a monochromatic coherent beam of radiation (hereinafter referred to as "light") at 12. A partially reflecting diagonally disposed plate 14 may be utilized to reflect a (typically small) proportion at 16 of the radiation to the radiation detector of a device 18 for monitoring the intensity and particularly the frequency stabilization of the laser. The frequency stabilization (and the approximate intensity stabilization) of the laser, although improving the precision of interferometers of this type, forms no part of the present invention. A beam expander (i.e., a negative or divergent lens 22 and a collimator lens 24 are preferably provided so as to increase the cross section of the beam, at 26 so as to decrease diffraction spreading of the beam thereafter. The laser is assumed to be so oriented about its own longitudinal axis that the plane of vibration (of the electric vector) of the linearly polarized light issuing therefrom is at 45° (as indicated at L, L') from the vertical plane passing through the axis of the beam. The terms "vertical" and "horizontal" refer to these actual directions, the perspective of the optical parts of FIG. 1 being seen from both above and to the left of the device; but of course the orientation in space is purely exemplary. Although the radiation is linearly polarized at 45°, it may nevertheless be thought of as having resolvable vertical and horizontal linearly polarized components at $L_V$ and $L_H$ respectively, (of lesser amplitude than L' but of equal amplitude to each other).

Although component 30 is a single rigid body (to simplify alignment and the like), it actually comprises upper and lower halves which are optically different. The lower half 32, through the rear surface of which beam 26 enters, comprises an interior optical surface 34 (vertically disposed but at a 45° angle to the axis of beam 26) which acts as a 100 percent plane polarization splitter. Thus the resolved horizontally vibrating component of beam 26 passes through surface 34 as beam 36, hereinafter referred to as the measuring beam, consisting of radiation having its electrical vector vibrating in the horizontal plane as indicated at $M_H$. The equal intensity, resolved vertically vibrating electrical vector component originally in beam 26 is reflected by surface 34 as beam 38, hereafter referred to as the standard beam, the vertical nature of its polarization being indicated at $S_V$. The standard beam (represented by a central ray) 38 is reflected as a return beam (represented by ray) 40 (parallel to and directly above ray 38) by a stationary reflector, such as a corner cube 42. Although reflector 42 is shown at some distance from the composite splitter element 30 for purposes of clarity, it preferably is actually rigidly attached to the facing surface thereof so as to insure invariability of its relative linear position (and therefore the distance travelled by the standard beam S (at 38, 40, etc.)). The measuring beam represented by its central ray 36 is similarly relfected from a, say, reflecting corner cube 44 so as to emerge as a vertically displaced beam (represented by its central ray) 46 anti-parallel and directly above ray 36. The reflecting cube 44 is of course mounted on an object at a relatively great distance as indicated by the break at 48; the object and therefore reflector 44 are of course movable both away and toward the rest of the apparatus along a line parallel to rays 36, 46 as indicated by arrow 50, the exact distance being of course the quantity desired to be measured.

The returning standard beam (represented by ray) 40 and the returning measuring beam (represented by ray) 46' are incident on adjacent surfaces of the upper cube prism 52. Because the corner cubes 42 and 44 are of identical size (and preferably identical orientation), both returning beams are also of the same height (i.e., their central rays 40, 46' respectively are on the same horizontal plane). Therefore both beams encounter the same area (but opposite sides of) the internal diagonal vertical surface 54 of upper prism 52, the intersection of the central rays being indicated at point 56. Although internal surface 54 is coplanar with the similar surface 34 of the lower prism 32, it is both structurally and functionally different in that it acts merely as a (non-polarizing) beam splitter which transmits a certain proportion of the standard beam (represented by ray 40) as a beam represented by its central ray 60, and reflects a (assumed to be the same) proportion of the returning measuring beam (represented by its central ray 46') along this same direction 60. It will be assumed for convenience (although it is not actually necessary as will be seen hereafter) that beam-splitting surface 54 transmits one-half of each of these beams, so that the composite beam 60 contains (as linearly polarized light, vibrating in the vertical plane) one-half the intensity, indicated at S/2, of the standard beam and similarly one-half of the intensity of (the linearly polarized light, vibrating in the horizontal plane) of the measuring beam, indicated at M/2. Similarly the (non-polarizing) beam splitting surface 54 will pass as beam 62 an equal proportion of the measuring beam (assumed to be one-half as indicated at M/2) and reflect an equal proportion (assumed to be one-half, S/2) of the standard beam. It may be noted that the standard beam component in beam 60 has been reflected once by internal surface 34 of lower prism 32 and then by the (three) surfaces of corner cube 42; while the measuring beam component in beam 60 has similarly been reflected once by surface 54 of upper prism 52 as well as by the (three) surfaces of the corner cube reflector 44 (identical to corner cube 42). Therefore as long as internal surfaces 34 and 54 either both cause phase reversal or neither do (i.e., exhibit the same phase reversal properties at 45° incidence) to the respective beams reflected thereby, either both or neither of the standard and measuring beam components will be phase reversed by 180°. For convenience it will be assumed that neither have been so reversed so that the directional arrows at S/2 and M/2 are shown in the same direction (when looking into the direction of the light) as the original resolved laser beam components in beam 26 of $L_V$ and $L_H$ respectively. Although the measuring beam component in the beam indicated by ray 62 has been reflected only by the corner cube 44 while the standard beam component has been reflected both by the internal surface 34 of lower prism 32 and the internal surface 54 of upper prism 52, the relative phase reversals (if any) will again be the same for both components as long as surfaces 34 and 54 both do or both do not cause a phase reversal. For purposes of convenience it will be assumed that the corner cubes 42 and 44 cause no such phase reversals. If the same assumptions are made not only for the corner cubes but also for the non-metallic internal surfaces 34 and 54, no phase reversals will occur. Also any lesser phase shifts will be assumed to be similar for all components; this is preferable for simplicity of description although not actually necessary as will be seen hereinafter. More importantly, it may be noted that regardless of any phase reversals or phase shifts, the linearly polarized components in beams 60 and 62 (i.e., S/2 and M/2 respectively) will be vibrating in the same original planes (namely, the vertical and horizontal) which are mutually perpendicular.

Each of the beams 60 and 62 then pass through identical quarter wave plates 64, 66, respectively which have their optical axis (and their vertical plane perpendicular to the optical axis of the beams) along the line that makes a 45° angle with the plane of vibration of both components, the optical axis being indicated by the dashed diagonal lines of elements 64 and 66. Since the optic axis of the identical quarter wave plates 64 and 66 make a 45° angle with the plane of vibration of both the measuring and standard beam components (for both beams 60, 62) both of the energizing beams 68 and 70 will comprise equal but opposite circularly polarized light components (hereinafter referred to as $S_c$ and $M_c$) as indicated at 72, 74 in beams 68 and 70 respectively. In particular one of the linearly polarized components (hereafter assumed to be the vertically vibrating standard beam components, S/2) will be converted in each instance to, say, left-hand circularly polarized light, $S_c$ (i.e., rotating counter-clockwise as seen when looking into the beam); while the other linearly polarized components (assumed to be the measuring beam components M/2 hereinafter) will emerge from the quarter wave plates as right-hand circularly polarized light, $M_c$. Assuming (as we have) that the intensity of the measuring and standard linearly polarized light components incident on the two quarter wave plates are equal to each other, the two emerging circularly polarized components will also be equal in intensity. Before describing how the desired (three) initial electrical signals are derived from beams 68 and 70 (by the use of plane polarizers and radiation detectors), it should first be understood how the two circularly polarized components of beams 68 and 70 interact (i.e., interfere) to provide information as to the changing distance being measured (i.e., the position along the direction 50 of the corner cube 44).

Each of the diagrammatic representations of FIG. 2, representing polarization components and resultants, are assumed to be taken with the observer looking into the direction of light (i.e., generally from the left for beam 68 and from the right for beam 70 in FIG. 1). FIG. 2a represents the (assumed to be left-handed) circularly polarized component (of either beams 68 or 70) $S_C$ resulting from the conversion of the vertically linearly polarized standard beam component S/2 passing through the quarter wavelength plate (64 or 66). As is well known, such left-hand circularly polarized light is best represented by a counter-clockwise rotating constant length vector, $E_S$, representing the amplitude of the electric vector (of, in this case, the circularly polarized standard beam component). This rapidly rotating electric vector $E_S$ is shown frozen at some specific time, $t_o$, which time has been chosen (merely for convenience) so that the electric vector is pointing straight up. FIG. 2b, in an analogous manner, illustrates at $M_C$ the oppositely (e.g., right-hand) circularly polarized radiation in beams 68 or 70 caused by the quarter wavelength plate (64 or 66) on the horizontal linearly polarized measuring beam component, M/2 (of beam 60 and 62). The equal amplitude (but oppositely rotating) circularly polarized measuring beam component $M_C$ also comprises a constant amplitude electric vector $E_M$ (in fact the same amplitude as $E_S$ in FIG. 2a if the standard beam component S/2 and measuring beam component M/2 are of equal intensity) rapidly rotating clockwise in this case. In FIG. 2b it is assumed that the distance $D_o$ travelled by the measuring beam is such that at the same time, $t_o$ as in FIG. 2a the vector $E_M$ is at the same vertical position as vector $E_S$ of FIG. 2a. As is well known, combining two equal amplitude but opposite type circularly polarized components will always result in linearly (i.e., plane) polarized light. In particular for the particular phase relationship shown in FIGS. 2a and 2b the resulting linearly polarized light will have a plane of vibration which is vertical.

FIG. 2c shows the position of the rotating electric vector (at $E'_M$) of the measuring beam component as it would be positioned at the same time, $t_o$ as in FIG. 2b if the object and therefore the corner cube 44 in FIG. 1 is positioned a very small amount (i.e., a fraction of a wavelength) farther from the rest of the apparatus than the distance $D_o$ assumed in FIG. 2b. This small additional distance $d$ will cause a phase shift in the electrical vector $E'_M$ in FIG. 2c (relative to $E_M$ in FIG. 2b) of an amount equal to $4\pi d/\lambda$. The optical path length difference is twice $d$ since the length of each of beams 36 and 46 is increased by $d$. An optical path difference of one wavelength will yield a complete rotation of electric vector (that is, $2\pi$) so that an increase in the distance $d$ equal to a wavelength (which increases the optical path by twice this amount) will cause a $4\pi$ rotation (two complete rotations) of the electric vector $E_M$.

FIG. 2d shows the effect of combining the FIG. 2a standard beam component and the measuring beam component having the particular phase relationship shown in FIG. 2c. First considered as a representation of the effect at the instantaneous time, $t_o$, the instantaneous electric vectors of the standard beam component of measuring beam component ($E_S$ and $E'_M$, respectively) will obviously yield the instantaneous resultant electric vector indicated at $E_S + E'_M$, which will bisect the angle between $E_S$ and $E'_M$ and therefore be at an angle equal to $2\pi d/\lambda$ relative to the instantaneous position of the electric vector $E_S$ of the standard beam component. In general (i.e., no longer restricted to the specific instantaneous time, $t_o$) the resultant of the two circularly polarized components $S_C$ and $M'_C$ will be linearly (i.e., plane) polarized light vibrating in the plane defined by $E_S + E'_M$ having a maximum amplitude equal to the length (if measured from the center of the circle) of the (no longer time restricted) resultant, $S_C + M'_C$. Thus the effect of increasing the distance of the corner cube 44 by this small distance d is to cause a relative phase change in the (circularly polarized) measuring beam component $M'_C$ of $4\pi d/\lambda$ but only a $2\pi d/\lambda$ phase change in the linear (plane) polarized radiation ($S_C + M'_C$) resulting from the combining or interference of the standard beam component $S_C$ and the changed-in-phase measuring beam component $M'_C$. FIG. 2e indicates the effect on the (plane of vibration of the) resulting linearly polarized radiation $S_C + M_C$ (where $M_C$ is at any phase relationship caused by any value of $d$) as the reflector 44 is moved further away, as indicated by the curved arrow 80 or closer, as indicated by arrow 82, relative to the rest of the apparatus in FIG. 1. As indicated in FIG. 2e by both the expression, $2\pi d/\lambda$, giving the angle of the plane of vibration of the resulting linearly polarized light with changing d and the labeling of the value of change of d giving the four coordinate (right-angle) direction changes, the plane of vibration of $S_C + M_C$ will rotate through 180° every time the corner cube reflector 44 moves along arrow 50 in FIG. 1 by an amount d equal to $\lambda/2$ in either direction. Since the electric vector vibrates in both directions in linearly polarized light, rotation of the plane of vibration by 180° is effectively a complete "cycle" of rotation for such radiation. More particularly a plane polarizer receiving linearly polarized light, the plane of vibration of which is rotating, will pass the same quantitative component every time the plane of vibration rotates through 180°.

Thus, each of the beams 68 and 70 in FIG. 1 will comprise (substantially identical) linearly polarized light, the (ideally identical for both beams) plane of which will rotate (through an angle $2\pi d/\lambda$) as the distance of the measuring corner cube 44 changes (by $d$) and a 180° ($\pi$) rotation being a complete cycle. As has also been seen the direction of rotation of the plane will be determined by whether the corner cube (and therefore the object beam) moves toward or away from the rest of the apparatus. To obtain two electrical signals (in quadrature) representative of the position (and direction of rotation) of this plane and therefore the linear position (and direction of movement) of the corner cube 44 and the object associated therewith, it is only necessary to pass such a beam through two plane polarizers oriented at 45° relative to each other (since 45° is one-quarter of the complete 180° "cycle") onto two separate detectors. This will yield information as to the direction of rotation of the plane of the linearly polarized beam and therefore the direction of movement of the corner cube, by noting which one of the two thus generated quadrature signals leads or lags the other.

The exemplary embodiment of the present invention differs from such known techniques (in somewhat similar devices) by obtaining three signals (two of which are in quadrature, the third of which is in complete phase opposition to one of the other two) and by utilizing these three signals to obtain two final (A.C.) signals in quadrature that have a zero D.C. component. In the exemplary embodiment this is done by effectively passing one of the beams through a pair of perpendicularly oriented plane polarizing analyzers to two separate detectors and passing the other beam through a single plane polarizer having its polarizing plane at a 45° angle (relative to the first two polarizers) to a third detector.

In the exemplary embodiment beam 70 in FIG. 1 is effectively passed through two mutually perpendicular plane polarizers to separate detectors. In particular a 100 percent polarizing beam splitting prism 81 (which may be identical to lower prism 32 already described) includes a diagonally positioned internal surface 83 which reflects linearly polarized components in a first plane (e.g., the vertical) as reflected beam 84, and transmits components in a plane at 90° (e.g., horizontal) to the first plane as beam 86. The mutual perpendicularity of the resolved plane polarized components of beams 84 and 86 are indicated by arrows V and H respectively. The now resolved perpendicular linearly polarized components of beam 84 and 86 rspectively fall upon two separate but identical radiation detectors 90a and 90b, respectively. The detector signal (after suitable amplification at 92a) from detector 90a will hereinafter be referred to as the A signal, as indicated in FIG. 1; while the electrical signal from detector 90b (hereinafter amplification by an identical amplifier 92b) is indicated at B. The third electrical signal is generated by passing the beam 68 through a plane polarizing analyzer 94 which is oriented at 45° as indicated by the lines thereon, so that the beam 96 impinging on the third detector 90c comprises linearly polarized components that vibrate in the diagonal plane indicated by the arrow D. The electrical output of detector 90c (after amplification at 92c) is indicated as and hereinafter referred to as the C signal).

The form of the signals A, B and C for a constant velocity movement of the corner cube 44 (say, away from the rest of the apparatus) so as to cause a constant angular velocity rotation of the plane of vibration of the linearly polarized beam 68 and 70 as indicated at $S_c + M_c$ in FIG. 2e (the direction of rotation assumed to be the direction of arrow 80 for such movement of the cube 44) is illustrated in FIGS. 3a, 3b and 3c. Assuming a starting distance $D_0$ such that d equals 0 (or more generally that $D = D_0 + d$ where d is 0, $\lambda/2$ $\lambda$, $3\lambda/2$, $2\lambda$, ...), the plane of vibration of $S_c + M_c$ shown in FIG. 2e will initially be vertical (or parallel to the plane polarizer associated with the A detector 90a as indicated at 101a in FIG. 2e), so that signal A in FIG. 3a will be a maximum as indicated at point 100a. Such vertically polarized light will of course have no horizontal component (see the polarization plane direction of channel B at 101b in FIG. 2e), so that signal B will be a minimum as indicated at 100b. For the same starting condition, namely, $d = 0$ (or $\lambda/2$, etc.), the 45° oriented plane polarizer 94 will pass a component from the vertically plane polarized beam 68 (assumed to be identical in every way to beam 70) which is equal to the projection of the amplitude in the vertical plane onto a plane at 45° (that is, the full intensity multiplied by the cosine of 45°, or one half) indicated at 101c in FIG. 2e. Thus at the starting position the amplified detector signal C will be at a mid-value (between those of 100a and 100b) as indicated at point 100c in FIG. 3c. As the distance of the cube reflector 44 changes (say, increases), the plane of vibration of the linearly polarized beams 68 and 70 both rotate clockwise as seen in FIG. 2e so that at some distance (approximately equal to $d = \lambda/12$, the plane of vibration will be that of the indicated vector at $S_c + M_c$ in FIG. 2e. During such movement the A signal will diminish to that indicated at point 102a, the B signal will increase from its minimum to a value as shown at 102b, and the C signal will increase from its mid-value to that shown at point 102c. As the value of d increases to $\lambda/8$ (so that the value of $2\pi d/\lambda = \pi/4$ or 45°), the vertical component signal A will have decreased to its mid-point value 104a, while the horizontal plane signal component B will have increased to the same mid-point value 104b; and the C channel signal will have increased to its maximum value 104c, since the plane of vibration will now be parallel to the plane passed by polarizer 94 in FIG. 1 (see line 101c in FIG. 2e). As the corner cube 44 and the object being monitored move farther away, the vertical component A signal will continue to diminish until it reaches its minimum at point 106a where $d = \lambda/4$ (or $2\pi d/\lambda = \pi/2$ or 90°), the plane of linearly polarized beams 68 and 70 now being horizontal. The horizontal component channel B will of course reach its maximum at 106b under these conditions; while the 45° component signal C will have diminished to its mid-value as indicated at 106c. Beyond this rotation (90°) of the plane polarization of beams 68 and 70, the vertical component signal A will increase to its mid-point value at 108a as d reaches $3\lambda/8$ (the plane of polarization in FIG. 2e having rotated from the vertical 135° so as to be along the diagonal line 108 in FIG. 2e). The horizontal plane component signal B will of course also reach its mid-point value at corresponding point 108b; while the diagonal plane signal C will be at a minimum at point 108c, since the plane of the polarizer indicated at 101c and the plane at 108 in FIG. 2e are perpendicular to each other. As d increases from $\frac{3}{8}\lambda$ to $\lambda/2$ the vertical resolved component signal A will increase to its maximum at 110a, since this 180° rotation has caused the vibration plane of the linearly polarized light in beams 68 and 70 to again be vertical. The horizontal signal component B will of course reach the minimum at point 110b when the vibration plane of the linearly polarized beam has become vertical again at $d = \lambda/2$, while the 45° resolved component signal C will again reach its mid-value at point 110c at this time.

Although the linearly polarized light has only rotated 180°, so as to be theoretically anti-parallel to its original position at $d = 0$ when $d = \lambda/2$, it is obvious that the rotation of the plane of linearly polarized light through 180° returns it to exactly the same condition since the electric vector is vibrating in both directions in the vibration plane. Thus the next 180° rotation of the vibration plane of the linearly polarized beams 68 and 70 (corresponding to d going from $\lambda/2$ to d becoming $\lambda$) is indistinguishable physically from the rotation already described (that is between $d = 0$ and $d = \lambda/2$). Therefore all three of the curves, A, B and C will merely repeat identically during the next 180° rotation of the linearly polarized beam to the condition where $d = \lambda$ (i.e., 360° rotation of the vibration plane) at points 112a, 112b and 112c. Thus for all practical purposes a 180° rotation of the vibration plane (corresponding to a movement of λ/2 of the corner cube 44) generates one complete cycle both of the polarization plane rotation and therefore of the electrical signals A, B and C as may readily be seen in FIGS. 3 a, 3b and 3c. Thus the abscissa distance of λ/2 (e.g., from point 100a to point 110a) is one complete cycle even though this corresponds to only one half of the complete rotation of the vibration plane; accordingly hereinafter a cycle of the electrical signals A, B and C and any electrical signals derived therefrom will be considered to be this λ/2 distance in which the electrical signal makes one complete cycle of its possible values.

It may be noted that signal A and signal C are essentially the conventional quadrature of signals usually developed in interferometers of this type. The A signal will be identical to that shown in FIG. 3a if the plane of vibration of the linearly polarized beams 68 and 70 were to rotate in the opposite direction (say, caused by the corner cube 44 moving toward the apparatus in the particular embodiment) so that the vibration plane of $S_c + M_c$ in FIG. 2e moves in the counter-clockwise direction indicated by arrow 82. On the other hand when the vibration plane rotates in this opposite direction, the C signal will be shifted one-half a cycle relative to the C signal shown in FIG. 3c so as to lead the A signal by 45 (electrical) degrees. Therefore the relative phase between signals A and C will yield the direction of rotation of the plane of polarization (and therefore the direction of movement of the object and the corner cube 44) while either signal (say, signal A) may be utilized (after suitable clipping or the like) to yield the actual fringe counts.

The disadvantage of such prior techniques (which typically neither develop nor utilize a signal such as a signal B in FIG. 3b) is that in general the D.C. level of signals corresponding to A and C are both variable and unknown. In particular there may be a component in both beams (68 and 70) that is not linearly polarized (including unpolarized or circularly polarized light) contributed not only by background radiation but also because the two interferred circularly polarized components (see FIGS. 2a through 2d) may not be of exactly the same intensity. The total intensity of such non-linearly polarized light is assumed for exemplary purposes to yield a D.C. "background" intensity having an ordinate value equal to the minimum of the A, B and C signals as indicated at dashed lines 118a, 118b and 118c, respectively, in FIGS. 3a - 3c, and assumed to have the same ordinate value, N. Regardless of the intensity (or even presence) of such non-linearly polarized light, the average D.C. level of the A, B and C signals will also be determined by their average D.C. content represented by the central horizontal lines 120a, 120b and 120c. Since the signals A, B and C represent light intensity signals as measured by detectors, the minimum points (such as at 106a, 100b and 108c) are never below zero, so that the average D.C. level of the A.C. signal is actually equal to one-half the amplitude of the A.C. signal and therefore is always substantial. In particular the D.C. level contribution of the A.C. signal itself will have an amplitude of M which is independent of the intensity (if any) of background D.C. component N. It should be noted that not only is the value of M substantial but that it varies directly with the intensity of the beams (at 68, 70) which in turn will vary with any variation in the intensity of the light source (laser 10) or any attenuation thereof (such as from dusty optics or the like). Thus the total D.C. level, indicated as $K_1$ in each of FIGS. 3a, 3b and 3c which is equal to M + N is always substantial regardless of the value of N. In the conventional technique substantial variation in the D.C. level of the conventionally utilized signals, (corresponding to the A and C signals) may cause errors in measuring the monitored distance. This is so since in effect such prior techniques determine when a signal, such as A, crosses a particular "slice level," which ideally would be line 120a in FIG. 3a. However, if the amplitude of signal A, say, diminishes, its average D.C. level (originally along line 120a) also falls below this level, so that at best the crossing occurs at non-symmetrical points on the diminished signal, and at worst the diminished signal falls entirely below the slice level yielding completely erroneous results. Setting the slice level substantially lower does not avoid the non-symmetry (and therefore the error of at least a small amount), and in fact, if the slice level is chosen too low (i.e., near line 118a) then an increase of the non-linearly polarized background radiation intensity N will cause the A signal never to cross the slice level, again leading to complete loss of fringe counts by the device.

In order to avoid the problems just pointed out the additional signal B has been provided as previously explained, which signal is always in exact phase opposition to the channel A signal and of the same amplitude. The A and B signals are subtracted as being fed to the opposite polarity inputs 122a, 122b respectively of a differential amplifier 124 in FIG. 1. The output of the amplifier 124 therefore has a signal X equal to A minus B, this signal being shown in FIG. 3d. Additionally the A and B signals are averaged (i.e., added and divided by two), as being supplied to the two inputs 126a and 126b respectively of a summing circuit 128, so that the output 130 has the average signal $A + B/2$. As may be seen from FIG. 3e, this is a D.C. signal having the value $K_1$. This signal is then subtracted from the C signal; specifically this signal may be supplied to one input 132 of a differential amplifier 134, to the other input of which at 132c is supplied to C signal. The output at 136 will therefore be a signal Y, equal to the difference of two inputs, namely, $C - A + B/2$, this signal being illustrated in FIG. 3f.

The finally derived X and Y signals as shown in FIGS. 3d and 3f respectively will have the same A.C. amplitude and the same phase relationships as signals A and C respectively, but will have a zero D.C. signal level. In particular both the background radiation signal level N and the average D.C. level contributed by the A.C. signal itself at M in FIG. 3a (and FIGS. 3b and 3c) will be eliminated, so that both the X and Y signals in FIGS. 3d and 3f respectively will be symmetrical about the zero volt level regardless of both the background (N) and the average D.C. level (M) of the original A, B and C signals. That this is accomplished by the relatively simple expedient of finding the difference between the A and B signals for the X signal and subtracting the average of the A and B signals from the C signal for the Y signal can best be seen from simplified equations for all five of these signals.

The general equation for the A signal in FIG. 3a may be written as:

$$A = K_1 + K_2 \cos wd, \qquad (1)$$

where:

$$K_1 = N + M$$

$K_2$ is the amplitude coefficient of the a.c. component (and $M$ and $K_2$ are both proportional to $S_c + M_c$ of FIG. 2e)

$$w = 4\pi/\lambda, \text{ and}$$
$$d = D - D_0$$

where $D$ is the distance of the corner cube, and $D_0$ is a particular distance of the corner cube at which the A signal is a maximum (i.e., for which the rotating linearly polarized radiation vector in FIG. 2e is vertical in the exemplary embodiment).

The corresponding basic equation for the B signal, which is electrically out of phase by $\pi$ or 180° from the A signal, is:

$$B = K_1 - K_2 \cos wd. \qquad (2)$$

The corresponding basic equation for the C signal, which is in quadrature (i.e., $\pi/2$ or 90 electrical degrees either leading or lagging, as in the assumed case, the channel A signal) may be written:

$$C = K_1 + K_2 \sin wd. \qquad (3)$$

Subtracting equation (2) from equation (1) yields:

$$X = A - B = 2K_2 \cos wd. \qquad (4)$$

Thus the X signal has no D.C. component whatsoever so that it is not only insensitive to variations in the background level (proportional to N in FIG. 3a) but also is symmetrical about the zero axis as seen in FIG. 3d regardless of the amplitude (i.e., the value of $K_2$) which affects the average D.C. level given by M in FIG. 3a (and therefore affects $K_1$).

The intermediate developed signal of FIG. 3e will have the value $A + B/2 = K_1$, so that the other final signal of FIG. 3f actually utilized is given by:

$$Y = C - A + B/2 = K_2 \sin wd. \qquad (5)$$

Thus the Y signal is also independent of any D.C. contributions from either background (i.e., related to N) or those which are a function of its amplitude (i.e., those related to M, equal to ½ $K_2$). Thus the final signals X and Y both have a zero D.C. level, so that they symmetrically cross the zero axis regardless of the value of $K_2$ (which may vary, as noted before, by either change in intensity of the source, dust on any of the common optical elements and particularly the corner cube 44 or even attenuation by scattering or absorption of the beams 36, 46). Thus by using a "slice level" of zero volts, and the X and Y signals for fringe counting, an interferometer according to the present invention will always count every fringe (i.e., crossing of say the X signal with the zero volt axis, regardless of the amplitude of this final signal, i.e., the value of $K_2$). In addition to assuring that no fringe count is ever lost, the zero D.C. level final signals have the additional advantage that the crossing points of the zero axis are always exactly the same distance (in this case corresponding to one quarter of a wavelength) apart so that the precision is independent of the amplitudes of the, say, X signal. As previously noted, this is not true of a signal such as A in FIG. 3a where if the slice level is chosen at 120a a change in the amplitude of the A.C. signal (which effectively changes the M value) will cause it to cross this level non-symmetrically, while a change in the background level N will also cause non-symmetrical crossing of the A.C. signal. As also previously noted use of a signal such as A and a slice level such as at 120a can actually lead to complete loss of counts (e.g., when the A.C. amplitude falls by more than 50 percent; where the A.C. amplitude falls (but less than 50 percent) and the background level also falls as may happen not only with a decrease in source energy but also when the corner cube becomes dirty or a scattering or absorbing atmosphere occurs between the corner cube and the rest of the apparatus; or where the background radiation intensity, N, increases above the chosen slice level, e.g., line 120a). It may also be noted that since the Y signal also remains symmetrical about zero volts regardless of the values of $K_2$ or $K_1$, that the Y signal remains in perfect quadrature with the X signal at all times.

The thus stabilized final signals X and Y may be further processed (see FIG. 1) as by the X and Y clipping circuijs 140, 142 respectively so as to emerge at the respective outputs 144, 146 in the manner schematically shown at 148 and 150 respectively. These signals may be supplied as the inputs 152, 154 to a bi-directional counter 156 of the type where one input (say 152) causes the counter to move one unit, while the phase of the other input determines the direction of counting. See for example U. S. Pat. No. 3,287,544. The output of the bi-directional counter may be fed to a readout 160, which may be so scaled as to yield directly the relative distance of the corner cube 44 and therefore the object being monitored in, for example, micro-inches.

Although it has been assumed for simplicity that the upper prism 52 and in particular its reflecting surface 54 is exactly 50 percent reflecting and 50 percent transmitting, it may be readily seen that this is not necessary as long as the ratio is known and compensated for. For example, if surface 54 is 66 ⅔ percent transmitting and only 33 ⅓ percent reflecting, all that is necessary is to adjust the gain of amplifier 92c to twice that of the equal gains of amplifier 92a and 92b; this will cause the C signal after the amplifier to be equal to the A and B signals in both A.C. and D.C. components. Any differential optical phase shifts caused in the standard and measuring beams by the different paths thereof (especially at surfaces 34 and 54) will necessarily cause identical effects (in the phase) of both signals A and B so as to merely change the nominal $D_0$ value. However, any such differential effect in the C channel (relative to A and B) at for example surface 54 can be compensated by merely rotating the polarizer 94 from its nominal 45° position until the C signal is exactly 90° out of phase with the A signal when the corner cube is moved at a constant velocity. It is merely noted that obviously not only will the B signal but also the Y signal change from the exemplary relationship (i.e., lagging the A and X signals by 90 electrical degrees) to the opposite relationship of leading them (by the same 90°) when the direction of movement of the corner cube 44 is the opposite (i.e., away from the rest of the instrument in the exemplary relationships hereinbefore assumed). This will of course cause the bi-directional counter 156 to count in the opposite direction.

In the following claims "proportionally subtracting" and "proportionally adding" two quantities means that one of the quantities is first multiplied by a proportionality factor (which may be greater, less than, or equal to one), so that at least some component in both of the two quantities are made equal before the actual subtracting or adding, respectively.

What is claimed is:

1. In a measuring interferometer of the type in which a first part causes transmission of a measuring beam of a first polarization condition over a variable length path desired to be measured, a second part causes said measuring beam to be combined with a standard beam of a second polarization condition to cause the resulting composite beam to have a characteristic which varies in accordance with the length of said variable path, and a third part generates information signals from changes in said characteristic indicative of both the quantity and direction of variation of said variable path, said third part comprising means for generating an initial set of signals having, in addition to an a.c. component varying with said desired-to-be-measured composite beam characteristic, an undesired d.c. component, and said third part further comprising means for deriving from said initial set of signals at least one final signal consisting substantially solely of an a.c. component varying in accordance with said characteristic, so that said final signal is substantially free of any undesired d.c. component, the improvement comprising:

said generating means of said third part is of such construction as to generate three initial signals (A, B, C) having a.c. and d.c. components, each signal having a d.c. and an a.c. component, the amplitudes of which are in fixed proportional relationship to the respective amplitudes of both the d.c. and a.c. component of both the others, and at least a particular two of said initial signals (A, B) have a.c. components which are of the same form and frequency but in opposed phase relationship;

said deriving means comprises means for proportionally subtracting said particular two initial signals so as to obtain as the difference one final a.c. signal (X) free of any d.c. component, whereby said final a.c. signal is of the same frequency, substantially the same form and of enhanced amplitude relative to the amplitude of said a.c. components of said particular two initial signals.

2. A measuring interferometer according to claim 1, in which:

said deriving means further comprises means for proportionally adding said particular two initial signals to obtain a combined signal which has a zero a.c. component but a d.c. component which is a fixed proportion of each of the d.c. components of said two particular initial signals and therefore is also a fixed proportion of the d.c. component of the third initial signal;

said deriving means further comprises means for proportionally subtracting said combined d.c. signal from said third initial signal (C) so as to obtain a second final signal (Y) which contains the a.c. component of said third initial signal but is free of the original d.c. component thereof.

3. A measuring interferometer according to claim 2, in which:

said generating means is of such construction that the a.c. component of said third initial signal (C) is of the same form and frequency but of a specific phase relationship to the a.c. components of each of said particular two initial signals (A, B), whereby said second final a.c. signal (Y) is in the same phase relationship relative to said one final signal (X) as said third signal (C) a.c. component was to the a.c. component of one (A or B) of said particular two initial signals.

4. A measuring interferometer according to claim 3, in which:

said specific phase relationship is phase quadrature between said a.c. component of said third initial signal (C) and the a.c. components of both said phase-opposed particular two initial signals (A, B), whereby said one (X) and said second (Y) final a.c. signals are also in quadrature.

* * * * *